W. C. MOORE.
ANIMAL TRAP.
APPLICATION FILED MAR. 20, 1916.
1,235,833.
Patented Aug. 7, 1917.
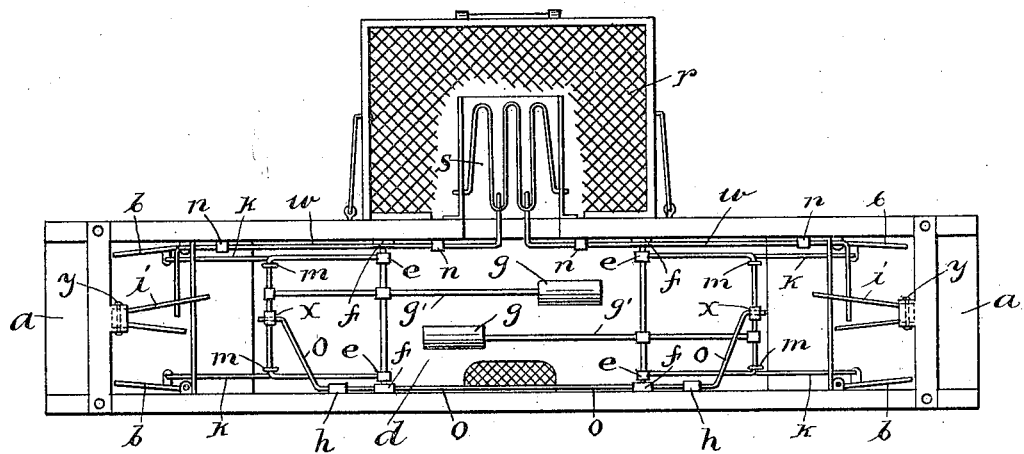
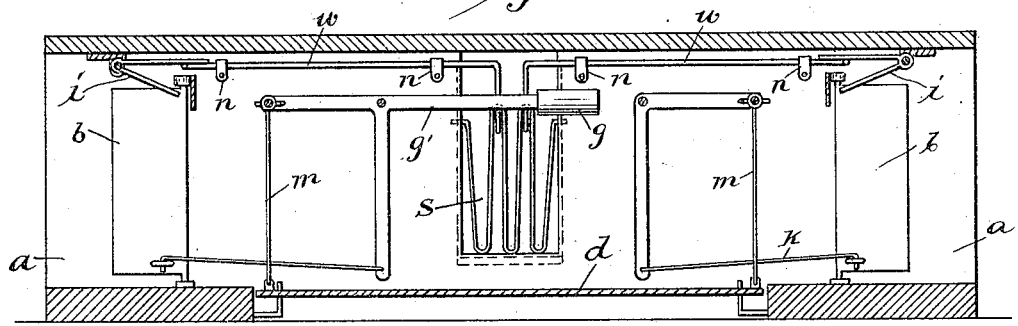
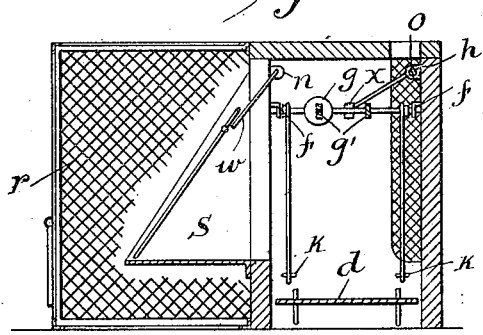
Inventor:
Waverly C Moore

UNITED STATES PATENT OFFICE.

WAVERLEY C. MOORE, OF ANDERSON, SOUTH CAROLINA.

ANIMAL-TRAP.

1,235,833.   Specification of Letters Patent.   Patented Aug. 7, 1917.

Application filed March 20, 1916. Serial No. 85,312.

*To all whom it may concern:*

Be it known that I, WAVERLEY C. MOORE, a citizen of the United States of America, residing at 105½ W. Benson street, in the city of Anderson, in the county of Anderson and State of South Carolina, have invented certain new and useful Improvements in Animal-Traps, of which the following is a specification.

The present invention appertains to animal traps, and aims to provide a novel and improved device for catching animals, the device having a novel mechanism to entrap or imprison the animals in an effective manner.

It is the object of the invention to provide a trap into which an animal can pass readily in search of food or when traveling from place to place, the trap being used indoors or out of doors according to the habit and nature of the animals to be caught, and having means whereby an animal in entering the trap will lock itself in to thereby prevent the escape or retreat of the animal, the device being further provided with a captivity chamber and novel means whereby the animal in passing on into the captivity chamber will re-set the trap for the entrance of another animal, making the operation automatic and continuous.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the improved trap, the top being removed, and portions being broken away.

Fig. 2 is a vertical longitudinal section.

Fig. 3 is a cross section, portions being broken away.

In carrying out the invention, there is provided an elongated casing or box $a$ providing an entrance passage having its ends open to provide entrances or inlet openings. A pair of shutters $b$ are hinged to the sides of the casing adjacent to each end thereof and swing open outwardly, as seen in Fig. 1. The bottom of the casing is provided between its ends and between the two pairs of shutters with a vertically movable platform or section $d$ suspended by hangers or suspending links $m$ pivoted at their upper ends to rocking levers $e$ carried by bearings $f$ supported by the sides of the casing near the top thereof. The levers $e$ have arms to which the hangers $m$ are connected, and have other arms which are connected by links $k$ with the shutters $b$, and said levers have still other arms $g'$ carrying weights $g$. These weights tend to swing the levers $e$, whereby to raise the hangers $m$ and platform $d$ and to push the links $k$ to swing the shutters or doors $b$ open. Latches $i$ are hinged or pivoted, as at $y$, to the casing above the entrances and project inwardly, whereby when the shutters $b$ are closed, the latches will drop in front of the shutters, to hold them in closed position. Each latch has two arms, one to engage the respective pair of shutters, and the other adapted to be operated for releasing the latch.

Attached removably in any suitable manner to one side of the casing $a$ between the ends thereof is a captivity chamber or cage $r$ communicating with the entrance passage by way of an opening in the respective side of the casing, thereby enabling an animal to pass from the entrance passage into the captivity chamber. A pivotally suspended shutter $s$ prevents the animal from passing back from the captivity chamber into the entrance passage, although the animal can readily pass under the shutter $s$ in entering the captivity chamber, said shutter swinging behind the animal to trap it in the captivity chamber.

The movement of the shutter $s$ is utilized for resetting the trap for the entrance of another animal. Thus, rock shafts or levers $w$ having terminal arms are journaled in bearings $n$ secured to that side of the casing to which the captivity chamber is applied, the arms at the adjacent ends of the rock shafts $w$ being engaged by the upper portion of the shutter $s$, and the arms at the remote ends of said rock shafts engaging under the operating arms of the latches $i$, whereby when the shutter $s$ is swung upwardly by the passing of an animal thereunder, this will rock the shafts $w$ thereby to raise the latches $i$ and release the shutters $b$.

The simultaneous operation of the levers $e$ and shutters is accomplished by the provision of a rock shaft $o$ journaled in bearings $h$ carried at that side of the casing $a$ opposite the captivity chamber, the rock shaft $o$ having terminal arms connected with the levers $e$ to cause them to oscillate simultaneously, any suitable connections between the rock shaft $o$ and lever $e$ being provided.

In operation, the platform $d$ is normally raised and the shutters $b$ are normally swung open under the influence of the weights $g$, whereby the animals can readily pass through either entrance in search of food (suitable bait being used in the trap to attract the animal if desired) or in traveling from one place to another. When the animal enters the trap and treads upon the platform $d$, the platform will be depressed, thus pulling down the hangers $m$ and swinging the levers $e$, which will in turn pull the links $k$ and swing the shutters or doors $b$ inwardly to closed position. The latches $i$ will drop down and hold the shutters in closed position, thereby preventing the escape or retreat of the animal, which will find its only outlet or avenue of escape by way of the opening leading to the captivity chamber or cage. When the animal passes on into the captivity chamber in its attempt to escape, the shutter $s$ being raised will raise the latches $i$ to release the shutters $b$, the shutter $s$ dropping behind the animal to prevent its return from the captivity chamber back into the entrance passage. The shutters $b$ being released, will reset the mechanism for the entrance of another animal, the weights $g$ raising the platform $d$ and swinging the shutters $b$ open. The animals which are entrapped in the captivity chamber can be exterminated or disposed of in any way preferred, said chamber or cage being removable for that purpose.

I claim as my invention,—

1. A trap embodying an elongated casing having open ends providing entrances, a captivity chamber at one side of said casing into which the animals can pass from the casing, hinged shutters for closing said entrances, a depressible platform within the casing between said shutters, rocking levers within the casing, hangers connecting said levers and platform, links connecting said levers and shutters, whereby the depression of the platform will close the shutters, and a shutter for entrapping the animals in the captivity chamber when they pass into the same.

2. A trap embodying an elongated casing having open ends providing entrances, a captivity chamber at one side of said casing into which the animals can pass from the casing, hinged shutters for closing said entrances, a depressible platform within the casing between said shutters, rocking levers within the casing, hangers connecting said levers and platform, links connecting said levers and shutters, whereby the depression of the platform will close the shutters, a pivotally suspended shutter for entrapping the animals in the captivity chamber, pivoted latches to hold the hinged shutters in closed position, rock shafts operated by the second mentioned shutter for moving the latches to release the hinged shutters, and means for raising the platform and opening the hinged shutters when they are unlatched.

WAVERLEY C. MOORE.

Witnesses:
G. W. COLE,
G. H. GEIGER.

Copies of this patent may be obtained for five cents each, by addressing the "Commissioner of Patents, Washington, D. C."